(12) United States Patent
Chen et al.

(10) Patent No.: US 8,738,895 B2
(45) Date of Patent: May 27, 2014

(54) TESTING A CONFIGURATION CHANGE

(75) Inventors: Danny Yen-Fu Chen, Austin, TX (US);
Sarah V. White Eagle, Austin, TX (US);
Fabian F. Morgan, Austin, TX (US);
Siddhartha Upadhyaya, West Bengal (IN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/468,545

(22) Filed: May 10, 2012

(65) Prior Publication Data
US 2013/0305030 A1 Nov. 14, 2013

(51) Int. Cl.
*G06F 1/24* (2006.01)
(52) U.S. Cl.
USPC .................. 713/100; 713/1; 713/2; 702/108; 702/119
(58) Field of Classification Search
USPC ............................ 713/1, 2, 100; 702/108, 119
See application file for complete search history.

(56) References Cited

U.S. PATENT DOCUMENTS

| | | | |
|---|---|---|---|
| 6,567,767 B1 * | 5/2003 | Mackey et al. ............... | 702/186 |
| 6,662,217 B1 * | 12/2003 | Godfrey et al. ............... | 709/219 |
| 7,296,077 B2 | 11/2007 | Harmon et al. | |
| 7,765,298 B2 | 7/2010 | Villavicencio | |
| 2004/0078692 A1 * | 4/2004 | Jackson et al. .................. | 714/38 |
| 2010/0057865 A1 | 3/2010 | Chan et al. | |
| 2012/0278607 A1 * | 11/2012 | Polat et al. .................... | 713/100 |
| 2013/0136253 A1 * | 5/2013 | Liberman et al. ........ | 379/265.09 |

OTHER PUBLICATIONS

Test Security Settings by Impersonating Users, Retrieved from the internet:< URL: http://www.labkey.org/wiki/home/Documentation/page.view?name=testingSecurity&_print=1>, [retrieved on Jan. 18, 2012], 2 pages.
User Administration and Security, Retrieved from the internet:< URL: http://dev.day.com/docs/en/cq/current/administering/security.html>, [retrieved on Jan. 18, 2012], 24 pages.
3.2. User Administration, Capter 3, Administering Bugzilla, Retrieved from the internet:< URL: http://www.bugzilla.org/docs/tip/en/html/useradmin.html>, [retrieved on Nov. 16, 2011], 5 pages.

* cited by examiner

*Primary Examiner* — Vincent Tran
(74) *Attorney, Agent, or Firm* — Schmeiser, Olsen & Watts; Mark Vallone

(57) ABSTRACT

An approach is presented for testing a change (i.e., configuration change) in a configuration of a computing environment. A user identifier (ID) of a user is received from an administrative user having an administrative user ID. First configurable attributes of the user ID are determined. A temporary simulation user ID (TSID) having second configurable attributes is generated so that the values of respective first and second configurable attributes are identical. The configuration change is received. The configuration change is associated with the TSID and with no other user ID. Based on the configuration change being associated with the TSID and with no other user ID, a simulation is performed by tracking data record modifications made by the TSID and based on the configuration change. The user ID and administrative user ID are unaffected by the configuration change. After completing the simulation, the data record modifications are undone.

20 Claims, 9 Drawing Sheets

TESTING A CONFIGURATION CHANGE

TECHNICAL FIELD

The present invention relates to a data processing method and system for managing an information technology system, and more particularly to a technique for testing a change in a configuration of a computing environment by simulating a user in an application.

BACKGROUND

Known information technology (IT) service management software provide customers with a comprehensive view of IT service management and tools to optimize end-to-end IT processes. Applications included in known IT service management software provide self-help for end users; a full service desk with incident, problem and change management; computing asset management; security, workflow and user interface design capabilities for process and screen customization; and/or a productivity tool and database for managing, auditing and coordinating change and configuration management processes. Functions provided by current IT service management software include dynamic login and security profiles and flexible configuration options. The dynamic login and security profiles allow a modification of security permissions of a user of an application so that resulting changes to the application's permission access and/or behavior occur on a subsequent login of the user. The flexible configuration options provide dynamic application behavior based on various users or groups of users, or based on data values in a record the user is viewing, through administrative applications, such as an application to design workflow processes. Business logic may be configured in known IT service management software so that although all users have access to the same application, what one user is able to view or perform may be different from what another user is able to view or perform.

BRIEF SUMMARY

In first embodiments, the present invention provides a method of testing a change in a configuration of a computing environment. The method includes a computer receiving a first user identifier (ID) of a first user in the computing environment, the first user ID received from a second user logged into the computing environment using a second user ID specifying the second user as having an authority of an administrator in the computing environment. The method further includes the computer determining a first set of one or more configurable attributes of the first user ID. The method further includes the computer generating a temporary user ID having a second set of one or more configurable attributes so that values of respective configurable attributes in the first and second sets of configurable attributes are identical. The method further includes the computer receiving the change in the configuration of the computing environment. The method further includes the computer associating the change in the configuration with the temporary user ID and with no other user ID. The method further includes, based on the change in the configuration being associated with the temporary user ID and with no other user ID, the computer performing a simulation by tracking modifications to data records made by the temporary user ID and based on the change in the configuration. The change in the configuration does not affect the first and second user IDs. The method further includes, after a completion of the simulation, the computer undoing the modifications to the data records.

In second embodiments, the present invention provides a computer system including a central processing unit (CPU), a memory coupled to the CPU, and a computer-readable, tangible storage device coupled to the CPU. The storage device contains instructions that, when carried out by the CPU via the memory, implement a method of testing a change in a configuration of a computing environment. The method includes the computer system receiving a first user identifier (ID) of a first user in the computing environment, the first user ID received from a second user logged into the computing environment using a second user ID specifying the second user as having an authority of an administrator in the computing environment. The method further includes the computer system determining a first set of one or more configurable attributes of the first user ID. The method further includes the computer system generating a temporary user ID having a second set of one or more configurable attributes so that values of respective configurable attributes in the first and second sets of configurable attributes are identical. The method further includes the computer system receiving the change in the configuration of the computing environment. The method further includes the computer system associating the change in the configuration with the temporary user ID and with no other user ID. The method further includes, based on the change in the configuration being associated with the temporary user ID and with no other user ID, the computer system performing a simulation by tracking modifications to data records made by the temporary user ID and based on the change in the configuration, the change in the configuration not affecting the first and second user IDs. The method further includes, after a completion of the simulation, the computer system undoing the modifications to the data records.

In third embodiments, the present invention provides a computer program product including a computer-readable, tangible storage device and computer-readable program instructions stored in the computer-readable, tangible storage device. The computer-readable program instructions, when carried out by a central processing unit (CPU) of a computer system, implement a method of testing a change in a configuration of a computing environment. The method includes the computer system receiving a first user identifier (ID) of a first user in the computing environment, the first user ID received from a second user logged into the computing environment using a second user ID specifying the second user as having an authority of an administrator in the computing environment. The method further includes the computer system determining a first set of one or more configurable attributes of the first user ID. The method further includes the computer system generating a temporary user ID having a second set of one or more configurable attributes so that values of respective configurable attributes in the first and second sets of configurable attributes are identical. The method further includes the computer system receiving the change in the configuration of the computing environment. The method further includes the computer system associating the change in the configuration with the temporary user ID and with no other user ID. The method further includes, based on the change in the configuration being associated with the temporary user ID and with no other user ID, the computer system performing a simulation by tracking modifications to data records made by the temporary user ID and based on the change in the configuration, the change in the configuration not affecting the first and second user IDs. The method further includes, after a completion of the simulation, the computer system undoing the modifications to the data records.

Embodiments of the present invention allow an administrator to quickly set up a recreate scenario for a customer issue and eliminate the error-prone manual configuration of a user identifier (ID) to test a fix, thereby reducing the time it takes to fix the customer issue. Embodiments of the present invention allow multiple concurrent user ID simulations, such as for two users configured in the same way, where one user is a functioning user and the other user is a non-functioning user. An administrator can walk through actions one-by-one, comparing the result of each action with the functioning user, as opposed to the non-functioning user. Furthermore, by the dynamic substitution of a temporary simulation ID with the actual user ID being simulated, an embodiment allows an administrator to simulate actual behavior a problem user is experiencing without having to obtain the user's password and without having to log in as the user. Still further, by allowing the simulation of a potential fix, an embodiment allows an administrator to quickly run through multiple regression tests to determine if an update works, without having to go through a full development to user acceptance testing (UAT) to production cycle. Further yet, an embodiment allows all general users to avoid being impacted by a configuration change because the change applies only to one or more specified temporary simulation user IDs during the simulation.

DETAILED DESCRIPTION

Overview

Figure 1:
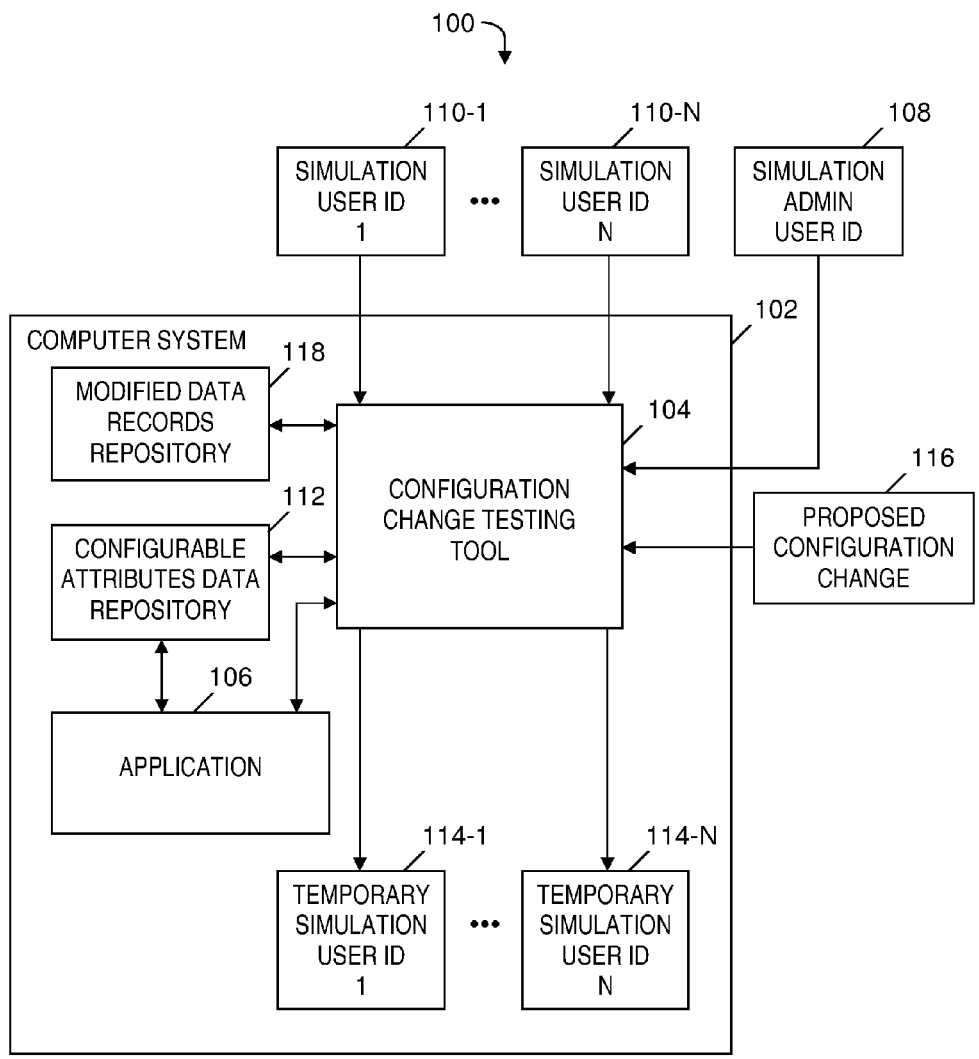
FIG. 1 depicts a block diagram of a system for testing a change in a configuration of a computing environment, in accordance with embodiments of the present invention.

Embodiments of the present invention enable an administrative user (also known as (a.k.a.) an admin user), or another user having appropriate authority, to temporarily log into a software application with a temporary simulation user ID (TSID) which has configurable attributes that match configurable attributes of a user ID of another user of the application. Configurable attributes of a user ID may include security groups and/or person groups to the user ID belongs. Utilization of a TSID may facilitate debugging issues with the application and may allow a simulation of a proposed fix of an issue with the application in a live instance (i.e., production environment), without having to first commit the changes, and without having to utilize a development and/or UAT environment. Embodiments of the present invention may be implemented as modifications to program code of a software application or software product having login capability, security profiles, and flexible configuration options, such as IBM® Service Management, a service management software suite included in Tivoli® software products offered by International Business Machines Corporation located in Armonk, N.Y.

An admin user may use the TSID to debug an application in a scenario in which a first user is experiencing an issue or defect in a live production instance of the application, whereas a second user is not experiencing any issues at all in the live instance. If the first user is configured differently from the second user, the utilization of the TSID may allow a debugging of the issue or defect without requiring the admin user to configure the ID of the admin user to match the configuration of the first user, thereby (1) bypassing a need to take away the admin user's administrative privileges and requiring another admin user to restore the administrative privileges, (2) avoiding the time needed to manually view and reconfigure an ID, and (3) eliminating a possibility of an action against a problematic record in a production instance showing up in an audit log as being performed by an admin user who has reconfigured the admin user ID as a customer ID.

If the first user who is experiencing the issue is configured in the same way as the second user who is not experiencing the issue, the TSID may be utilized to avoid a need to coordinate a schedule between the first user and the admin user so that the admin user can view the actions taken to cause the error.

Further, the admin user may utilize the TSID to test a proposed configuration change (a.k.a. a fix) to resolve issues in an application in a production instance, thereby avoiding a need for testing the fix on a development server, moving the fix to a UAT server for customer verification, and then scheduling a change to the production instance. Still further, the utilization of the TSID may allow testing of a fix in a production instance, where the fix addresses classes of issues, such as performance issues, that are not easily or quickly reproducible in a development environment.

System for Testing a Configuration Change

FIG. 1 depicts a block diagram of a system for testing a change in a configuration of a computing environment, in accordance with embodiments of the present invention. System 100 includes a computer system 102, which runs a software-based configuration change testing tool 104 and a software-based application 106. Configuration change testing tool 104 receives a simulation admin user ID (SAID) 108 and simulation user ID (SUID) 110-1 . . . SUID 110-N, where N≥1. The SAID 108 is the ID of an admin user of application 106. SUID 110-1 . . . SUID 110-N are user IDs of N respective users of application 106.

Configuration change testing tool 104 and application 106 access a configurable attributes data repository 112 that includes configurable attributes of SUID 110-1 . . . SUID 110-N, such as security profile(s) of each of SUID 110-1 . . . SUID 110-N and/or person group(s) to which each of SUID 110-1 . . . SUID 110-N belongs. Configuration change testing tool 104 generates TSID 114-1 . . . TSID 114-N, in one-to-one correspondence with SUID 110-1 . . . SUID 110-N so that value(s) of configurable attribute(s) of each generated TSID match value(s) of respective configurable attribute(s) of the corresponding SUID in SUID 110-1 . . . SUID 110-N. For example, TSID 114-1 may have configurable attributes whose values indicate that TSID 114-1 has security profile P and belongs to person group G, and corresponding SUID 110-1 has configurable attributes whose values indicate that SUID 110-1 also has security profile P and belongs to person group G (i.e., SUID 110-1 has the security profile and belongs to the person group that match the security profile and person group, respectively, of TSID 114-1). The configurable attributes of TSID 114-1 . . . TSID 114-N are included in configurable attributes data repository 112.

In one embodiment, configuration change testing tool 104 receives a proposed configuration change 116 (a.k.a. a fix) to a computing environment that addresses an issue or defect in application 106. Configuration change testing tool 104 tests the proposed configuration change 116 as described below in the discussion of FIGS. 2A-2B.

In one embodiment, configuration change testing tool 104 performs a simulation of one or more users of application 106 who are identified by SUID 110-1 . . . SUID 110-N, where the simulation includes configuration change testing tool 104 utilizing TSID 114-1 . . . 114-N to log on application 106 and perform action(s) by application 106. The action(s) performed by application 106 may be provided at least in part by proposed configuration change 116. The action(s) performed by application 106 may include storing and/or accessing one or more configurable attributes from configurable attributes data repository 112. Configuration change testing tool 104 may track data records (e.g., database records) that are modified during the simulation of the one or more users and may store the modified data records in a modified data records repository 118.

Although not shown in FIG. 1, computer system 102 may be coupled to an email system, so that configuration change testing tool 104 may track emails generated by TSID 114-1 . . . TSID 114-N and prevent emails sent by general users from being commingled with emails generated as a result of a simulation of SUID 110-1 . . . SUID 110-N.

The functionality of the components shown in FIG. 1 are described below in more detail in the discussions of FIGS. 2A-2B, FIG. 3, FIGS. 4A-4B, FIG. 5 and FIG. 6.

Process for Testing a Configuration Change

Figure 2A:
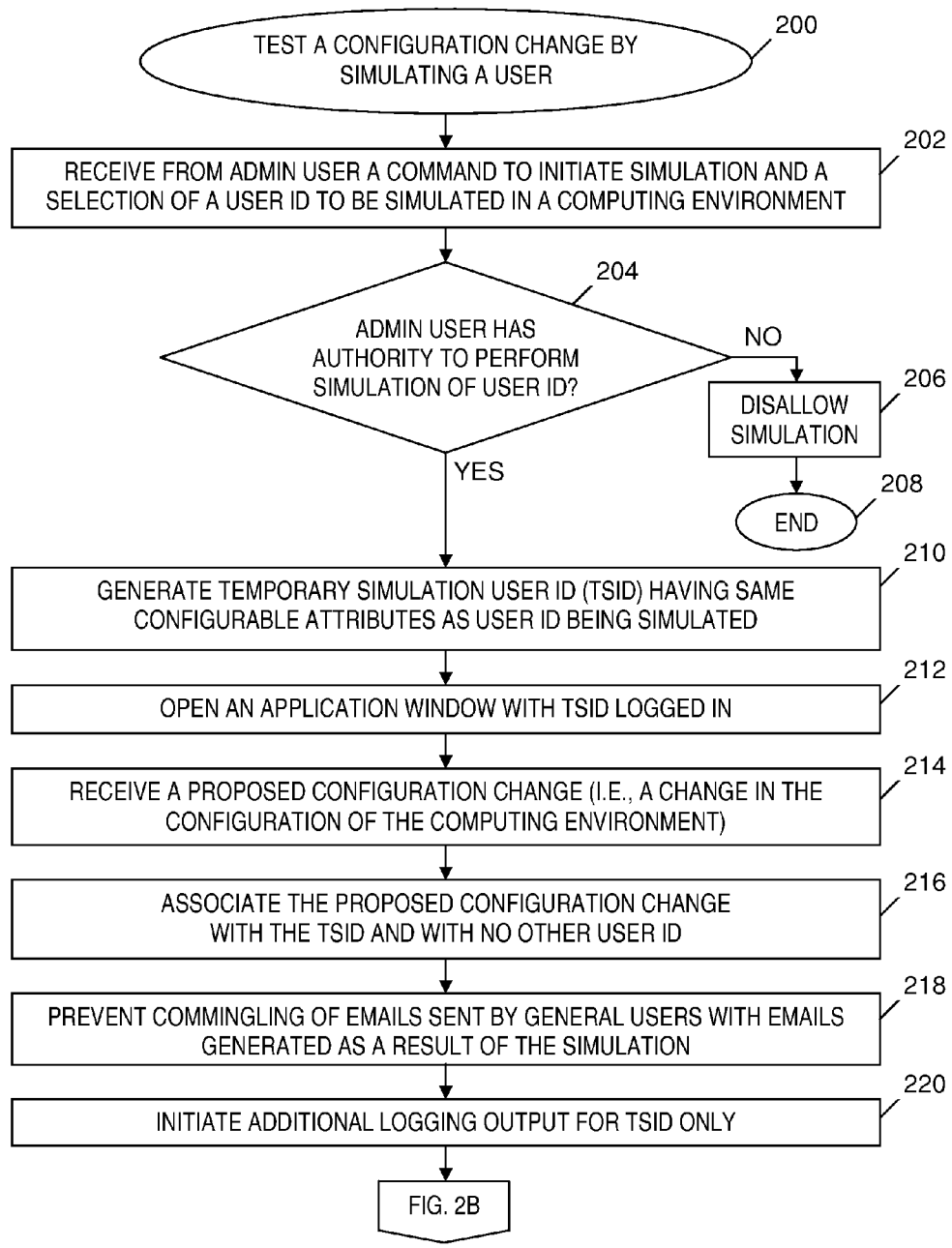
FIGS. 2A-2B depict a flowchart of a process of testing a change in a configuration of a computing environment, where the process is implemented in the system of FIG. 1, in accordance with embodiments of the present invention.
Figure 2B:
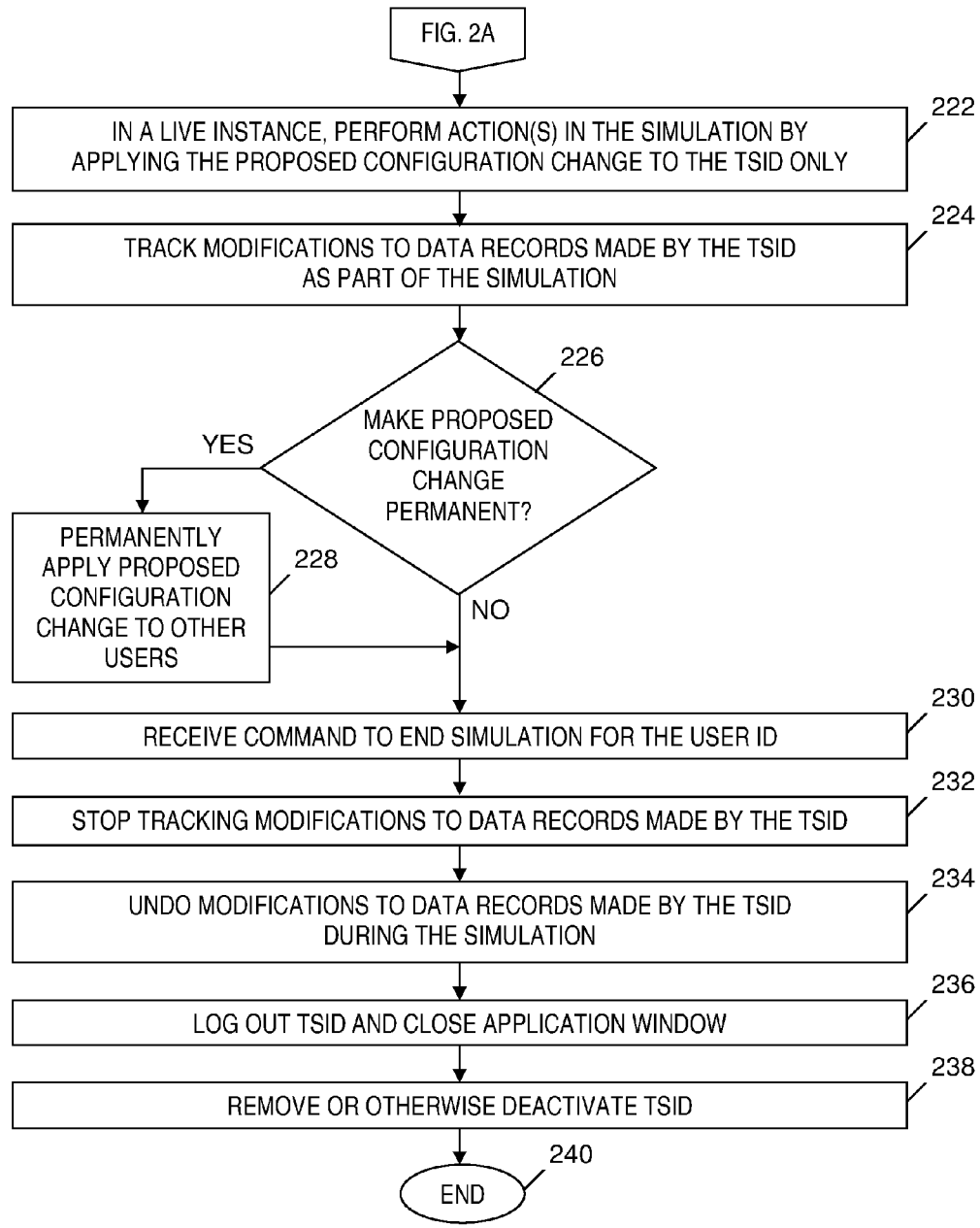

FIGS. 2A-2B depict a flowchart of a process of testing a change in a configuration of a computing environment, where the process is implemented in the system of FIG. 1, in accordance with embodiments of the present invention. The process for testing a configuration change by simulating a user begins at step 200. In step 202, configuration change testing tool 104 (see FIG. 1) receives from an admin user (1) a command to initiate a simulation of one or more users of application 106 (see FIG. 1) and (2) a selection of one or more SUIDs from SUID 110-1 . . . SUID 110-N (see FIG. 1), where each selected SUID identifies a respective user being simulated. Hereinafter, in the discussion of FIGS. 2A-2B, the admin user from whom the command and selection of the SUIDs is received in step 202 is referred to simply as "the admin user." Hereinafter, a simulation of a user of application 106 is also referred to as a simulation of the SUID of the user.

The remaining steps of FIGS. 2A-2B describe a simulation of one SUID, but those skilled in the art will recognize how each subsequent step may be modified so that a plurality of SUIDs may be simulated.

In step 204, configuration change testing tool 104 (see FIG. 1) determines whether the admin user has authority to perform the simulation of the SUID. If configuration change testing tool 104 (see FIG. 1) determines in step 204 that the admin user does not have the authority to perform the simulation of the SUID, then the No branch of step 204 is taken and step 206 is performed. In step 206, configuration change testing tool 104 (see FIG. 1) disallows the simulation of the SUID and subsequently, the process of FIGS. 2A-2B ends at step 208. In one embodiment, configuration change testing tool 104 (see FIG. 1) in step 206 prevents a presentation of an option to simulate the SUID. In another embodiment, configuration change testing tool 104 (see FIG. 1) in step 206 presents an error message to the admin user when the SAID attempts to invoke the simulation.

If configuration change testing tool 104 (see FIG. 1) determines in step 204 that the admin user has the authority to perform the simulation of the SUID, then the Yes branch of step 204 is taken and step 210 is performed.

In step 210, configuration change testing tool 104 (see FIG. 1) generates a TSID having configurable attributes whose values match the values of configurable attributes of the SUID. In an alternate embodiment, configuration change testing tool 104 (see FIG. 1) generates a TSID in step 210 that has one or more configurable attributes that comprise a proper subset of a set of configurable attributes of the SUID, where the one or more configurable attributes of the TSID have value(s) that match value(s) of the corresponding one or more configurable attributes of the SUID. Hereinafter, in the discussion of FIGS. 2A-2B, the TSID generated in step 210 is referred to simply as the TSID.

In one embodiment, configuration change testing tool 104 (see FIG. 1) (1) iterates over configurable attributes of each SUID in SUID 110-1 . . . SUID 110-N (see FIG. 1); (2) dynamically creates new respective TSIDs in TSID 114-1 . . . TSID 114-N (see FIG. 1), each TSID having values of configurable attributes that match values of configurable attributes of the corresponding SUID; and (3) returns name and password of each created TSID to the SAID.

In one embodiment, step 210 includes the configuration change testing tool 104 (see FIG. 1) prompting and receiving from the SAID a specified email address to which notifications are to be sent, so that any email generated by the TSID is directed to the specified email address, instead of to a user ID of a general user of application 106 (see FIG. 1). The restriction of the recipient of emails originating from the TSID is described below relative to step 218.

In step 212, configuration change testing tool 104 (see FIG. 1) opens a window of application 106 (see FIG. 1) with the TSID logged in to application 106 (see FIG. 1). In one embodiment, configuration change testing tool 104 (see FIG. 1) opens multiple windows to log in multiple TSIDs, respectively, into application 106, thereby allowing configuration change testing tool 104 (see FIG. 1) to address cases in which errors are generated via multiple users for the same customer being logged in at the same time and working on the same problem tickets or in the same application.

In step 214, configuration change testing tool 104 (see FIG. 1) receives a proposed configuration change 116 (see FIG. 1) (i.e., a proposed change in the configuration of the computing environment of application 106 (see FIG. 1)).

In step 216, configuration change testing tool 104 (see FIG. 1) associates the proposed configuration change 116 (see FIG. 1) with the TSID. For example, configuration change testing tool 104 (see FIG. 1) stores in a data repository coupled to computer system 102 (see FIG. 1) a specification of the proposed configuration change 116 (see FIG. 1) and the TSID.

In step 218, configuration change testing tool 104 (see FIG. 1) prevents a commingling of emails and/or other communications sent by general users of application 106 (see FIG. 1)

with emails and/or other communications generated as a result of the simulation of the SUID. In one embodiment, during the simulation of the SUID, configuration change testing tool 104 (see FIG. 1) tracks any emails generated by the TSID and dynamically replaces the recipient email addresses (e.g., in the to, cc, and bcc fields) with another email address associated with the TSID. The configuration change testing tool 104 (see FIG. 1) receives the other email address from an entry provided by the admin user prior to step 218 (e.g., in step 202, at the initiation of the simulation). By replacing the recipient email addresses with the other email address associated with the TSID, customer users are prevented from receiving email generated during the simulation of the SUID, which would be potentially confusing to the customer users. In one embodiment, the TSID is configured prior to step 218 so that the TSID does not receive emails sent to the person group to which the TSID belongs, thereby eliminating confusion in the output of debugging.

Prior to step 220, the admin user or another administrative user may configure the configuration change testing tool 104 (see FIG. 1) to generate additional logging information for the TSID. In step 220, if configuration change testing tool 104 (see FIG. 1) is configured for additional logging, then configuration change testing tool 104 (see FIG. 1) initiates additional logging output for the TSID only, and not for other users of application 106 (see FIG. 1). For example, configuration change testing tool 104 (see FIG. 1) may append an additional logger to the main system logger(s), where the additional logger provides logging information at a more detailed level of granularity (e.g., more SQL outputted, etc.). As a result of appending the additional logger, the configuration change testing tool 104 (see FIG. 1) may output to a specific log window the modifications to the logs while the SAID is performing the simulation.

Following step 220, the process of FIGS. 2A-2B continues with step 222 in FIG. 2B. In step 222, in a live instance of application 106 (see FIG. 1), configuration change testing tool 104 (see FIG. 1) performs action(s) in the simulation of the SUID by applying the proposed configuration change 116 (see FIG. 1) to the TSID, but not to other user IDs of application 106 (see FIG. 1).

For example, in the live instance in step 222, the SAID may test one or more proposed configuration changes to the computing environment of application 106 (see FIG. 1), including the proposed configuration change 116 (see FIG. 1) to test whether a performance improvement decreases response time in application 106 (see FIG. 1) to an acceptable level. To perform the aforementioned test of the performance improvement, the SAID may invoke a command to denote which configuration changes are temporary and to which TSID in TSID 114-1 . . . TSID 114-N (see FIG. 1) the configuration changes apply.

For instance, the SAID may change an original SQL query fragment to another SQL query fragment to determine if the change improves performance (e.g., the change in the SQL query fragment is the proposed configuration change 116 in FIG. 1). Configuration change testing tool 104 (see FIG. 1) leaves the original SQL query fragment unchanged, but creates the other (i.e., modified) SQL query fragment and receives from the SAID a specification of the TSID(s) in TSID 114-1 . . . TSID 114-N (see FIG. 1) to which the other SQL query fragment applies. Therefore, when the logic of application 106 (see FIG. 1) enters the code path in which the original SQL query fragment should be dynamically applied, configuration change testing tool 104 (see FIG. 1) checks whether there exists a modified SQL query fragment for the TSID that is logged into application 106 (see FIG. 1). In the example in this paragraph, configuration change testing tool 104 (see FIG. 1) determines that the modified SQL query fragment exists for the TSID that is logged into application 106 (see FIG. 1), and in response, utilizes the modified SQL query fragment in the code path. If the configuration change testing tool 104 (see FIG. 1) had determined that a modified SQL query fragment did not exist for the logged in TSID, then the code path would have utilized the original SQL query fragment.

The feature described in step 222 allows the configuration change testing tool 104 (see FIG. 1) to apply the proposed configuration change 116 (see FIG. 1) only to the TSID while the proposed configuration change 116 (see FIG. 1) is being tested, whereas other users of application 106 (see FIG. 1) experience no impact from the proposed configuration change 116 (see FIG. 1).

It should be noted that the configuration change testing tool 104 (see FIG. 1) checking whether there exists a proposed configuration change for a TSID logged into application 106 (see FIG. 1) is required only if configuration change testing tool 104 (see FIG. 1) determines that at least one simulation of a SUID included in SUID 110-1 . . . SUID 110-N (see FIG. 1) is active, thereby reducing the impact that the aforementioned checking has on the performance of application 106 (see FIG. 1).

In step 224, configuration change testing tool 104 (see FIG. 1) tracks modifications to data records made by the TSID as part of the simulation of the SUID. The configuration change testing tool 104 (see FIG. 1) stores the tracked modifications of the data records in modified data records repository 118 (see FIG. 1). Each modification to a data record being tracked in step 224 may be an insertion of the data record into a database, a deletion of the data record from the database, or an update of the data record in the database.

While the SAID is performing actions during a simulation of the SUID by utilizing the TSID, configuration change testing tool 104 (see FIG. 1) may track the modifications of the data records in step 224 by storing indications of the modifications in temporary storage files. In one embodiment, modified data records repository 118 (see FIG. 1) includes the temporary storage files that store the indications of the modifications of the data records tracked in step 224.

For a modification that is an update to or a delete from a database, configuration change testing tool 104 (see FIG. 1) exports the data record. For a modification that is an insert to a database, configuration change testing tool 104 (see FIG. 1) stores the primary key of the newly created data record. Known multi-user applications track the user who is currently logged in. The configuration change testing tool 104 (see FIG. 1) uses the tracking of the user who is currently logged in to determine whether the tracked user is identified with a TSID included in TSID 114-1 . . . TSID 114-N (see FIG. 1). If the tracked user is identified with a TSID, then configuration change testing tool 104 (see FIG. 1) tracks the TSID's interactions with the database.

In some cases regarding troubleshooting an issue with application 106 (see FIG. 1), it may be necessary to invoke actions as the SUID of the actual user who is experiencing the issue in order to re-create the scenario in which the issue arises. When the simulation of the SUID begins, the configuration change testing tool 104 (see FIG. 1) may receive a selection of an option (or retrieve a configuration from a property file (not shown in FIG. 1)) to execute all the actions as the SUID, rather than as the TSID, even though the SAID is logged in as the TSID. For example, in the case in which user IDs for User 1 and User 2 are configured in exactly the same way, and User 1 experiences an issue with application 106 (see FIG. 1) while User 2 does not experience the issue, the admin user may select an option so that the configuration change testing tool 104 (see FIG. 1) invokes actions as the user ID of User 1, rather than as the TSID. In one embodiment, to implement the execution of actions as the SUID rather than as the TSID, the configuration change testing tool 104 (see FIG. 1) intercepts each action performed by the TSID and substitutes the value of the SUID in any modifications (e.g., SQL queries, etc.) before executing a command that invokes the action.

The selection of the option to invoke actions as the SUID rather than as the TSID may be advantageous in cases in which an element or characteristic of the SUID itself causes the issue, and the element of characteristic may not be immediately apparent. For example, the length of the SUID may cause an issue in a nested, complex query, and the resulting error message may be cryptic. As other examples, a special character in the SUID may cause the issue, or the records associated to the SUID may cause the issue. For instance, queries may be made using the SUID, and the data in the records accessed by the queries may have special characters that are causing the issue. If configuration change testing tool 104 (see FIG. 1) issued the queries as the TSID, the associated records returned may be different from the records returned had the queries been issued as the SUID, even though the values of the configurable attributes of the TSID are the same as the values of the configurable attributes of the SUID. Since the records returned when issuing the queries as the TSID may be different from the records returned when issuing the queries as the SUID, the issue may not be reproduced when issuing the queries as the TSID.

In step 226, if configuration change testing tool 104 (see FIG. 1) determines that the proposed configuration change 116 (see FIG. 1) should be made permanent (e.g., by receiving an invocation of a command from the SAID), then the Yes branch of step 226 is taken and step 228 is performed. In step 228, configuration change testing tool 104 (see FIG. 1) permanently applies the proposed configuration change 116 (see FIG. 1) to other users (e.g., all users) of application 106 (see FIG. 1). For example, configuration change testing tool 104 (see FIG. 1) in step 228 replaces the original SQL query fragment with the modified SQL query fragment and removes the copy of the modified SQL query fragment associated with the TSID(s), thereby subsequently applying the modified SQL query fragment to all users of application 106 (see FIG. 1). It should be noted that some configuration changes require a restart of application 106 (see FIG. 1) in order to take effect with the other users, and therefore waiting for a Change window may delay making such a configuration change permanent in step 228. Otherwise, permanently applying the proposed configuration change 116 (see FIG. 1) in step 228 is immediate.

Returning to step 226, if configuration change testing tool 104 (see FIG. 1) determines that the proposed configuration change 116 (see FIG. 1) should not be made permanent, then the No branch of step 226 is taken and step 230 is performed. Step 230 also follows step 228.

In step 230, configuration change testing tool 104 (see FIG. 1) receives a command from the SAID to end the simulation of the SUID.

In step 232, and in response to receiving the command to end the simulation in step 230, configuration change testing tool 104 (see FIG. 1) stops tracking modifications to data records made by the TSID.

In step 234 and in response to receiving the command to end the simulation in step 230, configuration change testing tool 104 (see FIG. 1) undoes the modifications to the data records performed by the TSID and tracked in step 224. Undoing the modifications includes configuration change testing tool 104 (see FIG. 1) utilizing the temporary storage files in which the indications of the modifications were stored in step 224. If a tracked modification included a data record being updated or deleted, then in step 234, configuration change testing tool 104 (see FIG. 1) re-imports the exported data record back into the database. If a tracked modification included a data record being inserted, then configuration change testing tool 104 (see FIG. 1) in step 234 deletes the inserted data record from the database based on the stored primary key.

Some inserted data records (e.g., Incident or Change ticket data) are complex, with data being inserted into multiple tables. For such complex inserted data records that are classified as transactional data, configuration change testing tool 104 (see FIG. 1) does not delete the data records to undo the modification; instead, configuration change testing tool 104 (see FIG. 1) changes the status of the data records to canceled or otherwise deactivated.

In step 236, configuration change testing tool 104 (see FIG. 1) logs out the TSID and closes the application window that was opened in step 212 (see FIG. 2A). Also in step 236, configuration change testing tool 104 (see FIG. 1) closes any additional logging window that may have been opened in step 220 (see FIG. 2A).

In step 238, configuration change testing tool 104 (see FIG. 1) removes or otherwise deactivates the TSID. Also in step 238, configuration change testing tool 104 (see FIG. 1) removes values of configurable attributes that associate the TSID with particular groups, such as the association between the TSID and the person group(s) to which the SUID belongs.

The process of FIGS. 2A-2B ends at step 240. After step 240, the process of FIGS. 2A-2B may be repeated to simulate another SUID included in SUID 110-1 . . . 110-N (see FIG. 1) by generating and utilizing another TSID included in TSID 114-1 . . . TSID 114-N (see FIG. 1).

In an alternate embodiment, the process of FIGS. 2A-2B includes the tracking of modifications performed by a TSID in step 224 (see FIG. 2A) to debug an issue with application 106 (see FIG. 1), but does not include receiving proposed configuration change 116 (see FIG. 1) in step 214 (see FIG. 2A), associating the proposed configuration change with the TSID in step 216 (see FIG. 2A), testing the proposed configuration change in step 222, determining whether or not to make the proposed configuration change permanent in step 226 and making the proposed configuration change permanent in step 228.

Figure 3:
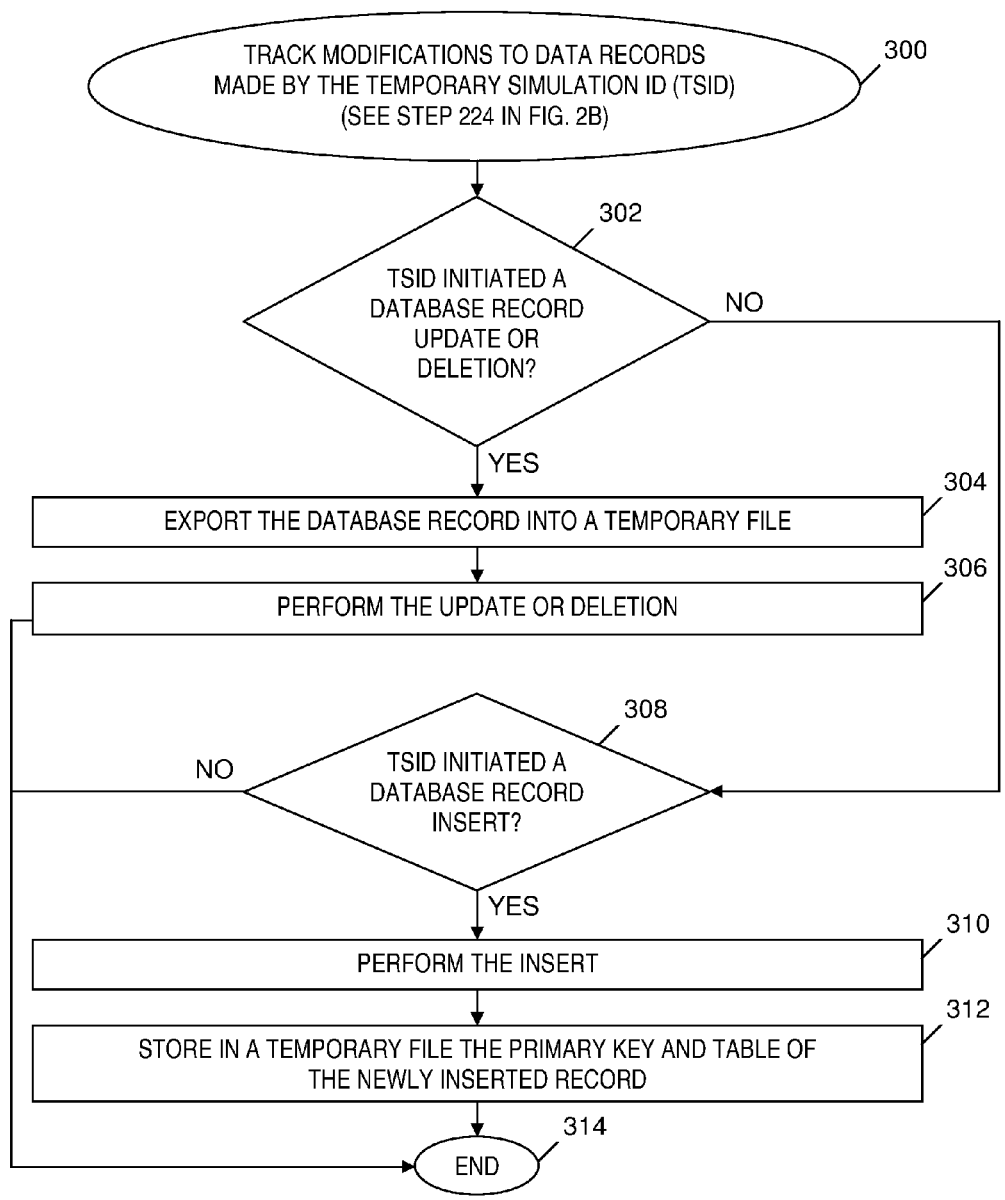
FIG. 3 is a flowchart of a process of tracking modifications to data records made by a temporary simulation ID, in accordance with embodiments of the present invention.

FIG. 3 is a flowchart of a process of tracking modifications to data records made by a temporary simulation ID, in accordance with embodiments of the present invention. The process of tracking modifications to data records made by a TSID begins at step 300. In one embodiment, the process of FIG. 3 is included in step 224 in FIG. 2B. Hereinafter in the discussion of FIG. 3, the TSID refers to the TSID generated in step 210 (see FIG. 2A) and the SUID refers to the SUID being simulated in the process of FIGS. 2A-2B. In step 302, if configuration change testing tool 104 (see FIG. 1) determines that the TSID initiated an update of a database record or initiated a deletion of a database record, then the Yes branch of step 302 is taken and step 304 is performed.

In step 304, configuration change testing tool 104 (see FIG. 1) exports into a temporary storage file the database record whose update or deletion is determined to be initiated in step 302.

In step 306, configuration change testing tool 104 (see FIG. 1) performs the update of the database record if configuration change testing tool 104 (see FIG. 1) determined in step 302 that the TSID initiated an update, or performs the deletion of the database record if configuration change testing tool 104 (see FIG. 1) determined in step 302 that the TSID initiated a deletion.

Returning to step 302, if configuration change testing tool 104 (see FIG. 1) determines that the TSID did not initiate a database record update or deletion, then the No branch of step 302 is taken and step 308 is performed. In step 308, if configuration change testing tool 104 (see FIG. 1) determines that the TSID initiated an insert of a database record, then the Yes branch of step 308 is taken and step 310 is performed. In step 310, configuration change testing tool 104 (see FIG. 1) performs the insert of the database record whose initiation was determined in step 308. In step 312, configuration change testing tool 104 (see FIG. 1) stores in a temporary storage file the primary key and database table of the database record newly inserted in step 310. Following step 312, the process of FIG. 3 ends at step 314.

Returning to step 308, if configuration change testing tool 104 (see FIG. 1) determines that the TSID did not initiate a database record insert, then the process of FIG. 3 ends at step 314.

The process of FIG. 3 also ends at step 314 following step 306.

In one embodiment, the process of FIG. 3 is repeated for one or more other modifications of database records.

Figure 4A:
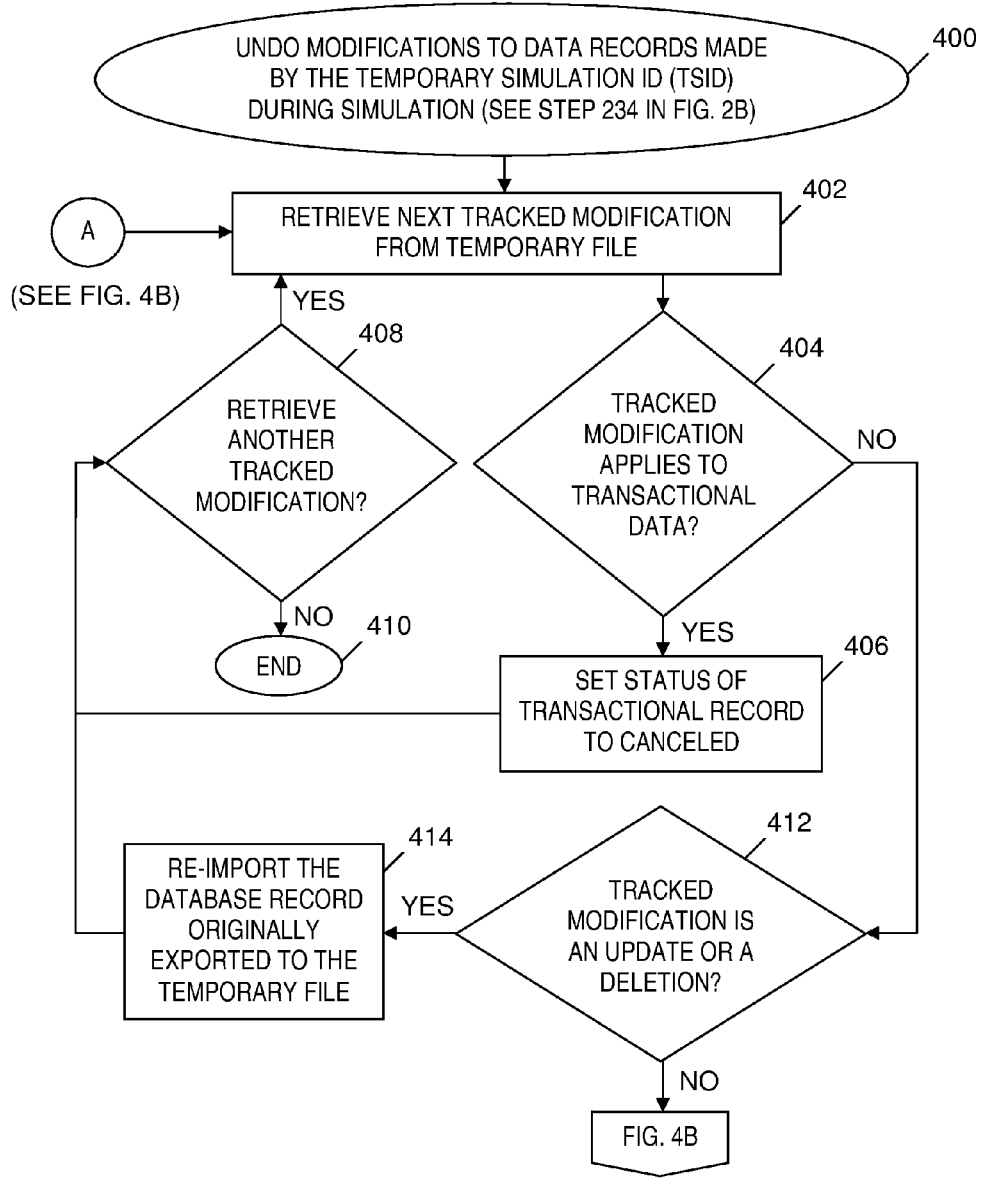
FIGS. 4A-4B depict a flowchart of a process of undoing modifications to data records made by a temporary simulation ID during a simulation, in accordance with embodiments of the present invention.
Figure 4B:
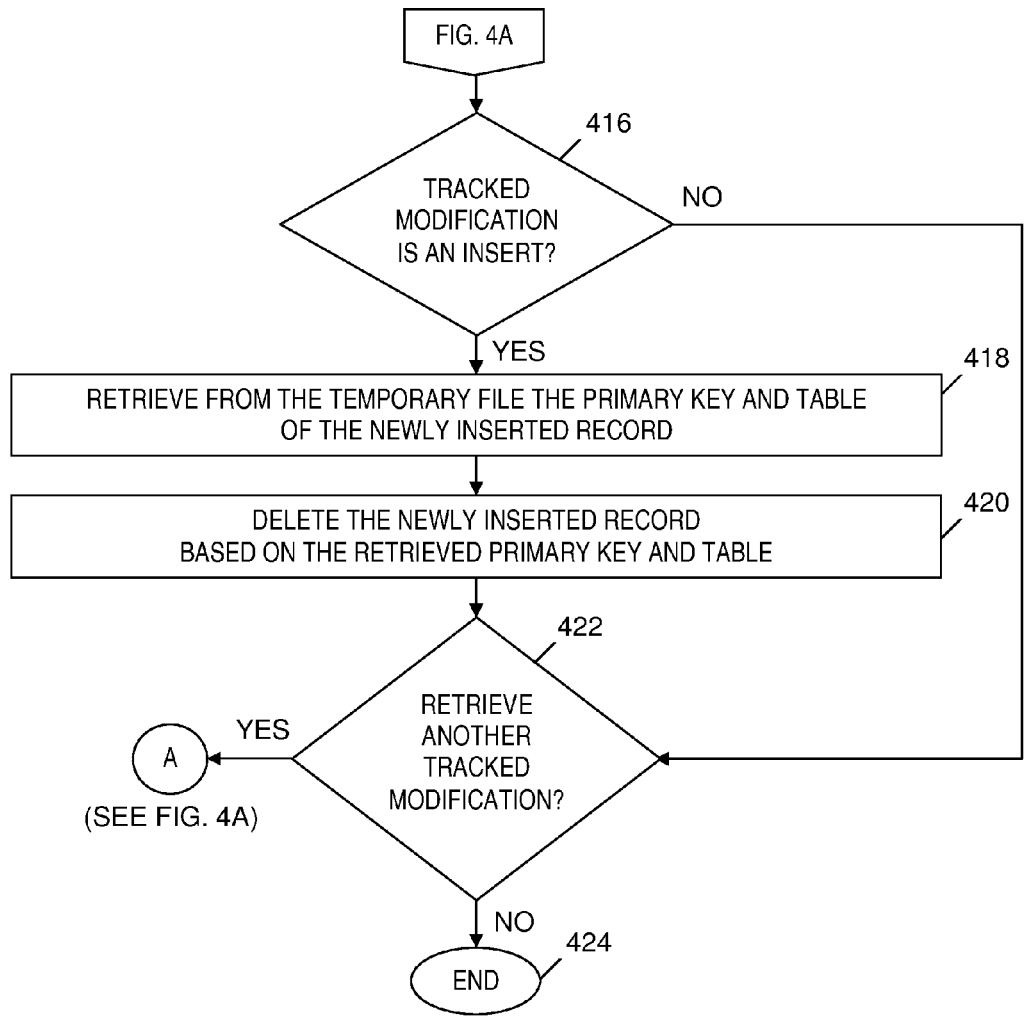

FIGS. 4A-4B depict a flowchart of a process of undoing modifications to data records made by a temporary simulation ID during a simulation, in accordance with embodiments of the present invention. The process of undoing modifications to data records made by a TSID during a simulation of a SUID begins at step 400. In one embodiment, the process of FIGS. 4A-4B is included in step 234 in FIG. 2B and follows the process of FIG. 3. Hereinafter, in the discussion of FIGS. 4A-4B, the TSID refers to the TSID generated in step 210 (see FIG. 2A) and the SUID refers to the SUID being simulated in the process of FIGS. 2A-2B. In step 402, configuration change testing tool 104 (see FIG. 1) retrieves the next tracked modification from the temporary storage file in which the modification was stored in step 224 (see FIG. 2B). Hereinafter, in the discussion of FIGS. 4A-4B, the next tracked modification retrieved in step 402 is also referred to simply as "the tracked modification."

In step 404, if configuration change testing tool 104 (see FIG. 1) determines that the tracked modification applies to transactional data in a transactional record, then the Yes branch of step 404 is taken and step 406 is performed. In step 406, configuration change testing tool 104 (see FIG. 1) sets the status of the transactional record to canceled.

In step 408, if configuration change testing tool 104 (see FIG. 1) determines that another tracked modification (i.e., another modification that had been tracked in step 224 in FIG. 2B) has not yet been retrieved in step 402, then the Yes branch of step 408 is taken and the process of FIGS. 4A-4B is repeated starting at step 402. If configuration change testing tool 104 (see FIG. 1) determines in step 408 that no other tracked modification remains to be retrieved from the temporary storage file, then the No branch of step 408 is taken and the process of FIGS. 4A-4B ends at step 410.

Returning to step 404, if configuration change testing tool 104 (see FIG. 1) determines that the tracked modification does not apply to transactional data, then the No branch of step 404 is taken and step 412 is performed.

In step 412, if configuration change testing tool 104 (see FIG. 1) determines that the tracked modification is an update or a deletion of a database record, then the Yes branch of step 412 is taken and step 414 is performed. In step 414, configuration change testing tool 104 (see FIG. 1) re-imports the database record that had been exported in step 304 (see FIG. 3). After step 414, the process of FIGS. 4A-4B continues with step 408, as described above.

Returning to step 412, if configuration change testing tool 104 (see FIG. 1) determines the tracked modification is not an update or deletion of a database record, then the No branch of step 412 is taken and step 416 in FIG. 4B is performed.

In step 416, if configuration change testing tool 104 (see FIG. 1) determines that the tracked modification is an insert of a database record, then the Yes branch of step 416 is taken and step 418 is performed. In step 418, configuration change testing tool 104 (see FIG. 1) retrieves from the temporary storage file the primary key and database table of the newly inserted record (i.e., the database record inserted in step 310 (see FIG. 3)). The aforementioned temporary storage file from which the primary key and database table are retrieved in step 418 is the temporary storage file into which the primary key and database table were stored in step 312 (see FIG. 3).

In step 420, configuration change testing tool 104 (see FIG. 1) deletes the newly inserted database record based on the primary key and database table retrieved in step 418.

In step 422, if configuration change testing tool 104 (see FIG. 1) determines that another tracked modification (i.e., another modification that had been tracked in step 224 in FIG. 2B) has not yet been retrieved in step 402 (see FIG. 4A), then the Yes branch of step 422 is taken and the process of FIGS. 4A-4B is repeated starting at step 402 (see FIG. 4A). If configuration change testing tool 104 (see FIG. 1) determines in step 422 that no other tracked modification remains to be retrieved from the temporary storage file, then the No branch of step 422 is taken and the process of FIGS. 4A-4B ends at step 424.

Returning to step 416, if configuration change testing tool 104 (see FIG. 1) determines that the tracked modification is not an insert of a database record, then the No branch of step 416 is taken and step 422 is performed, as described above.

Figure 5:
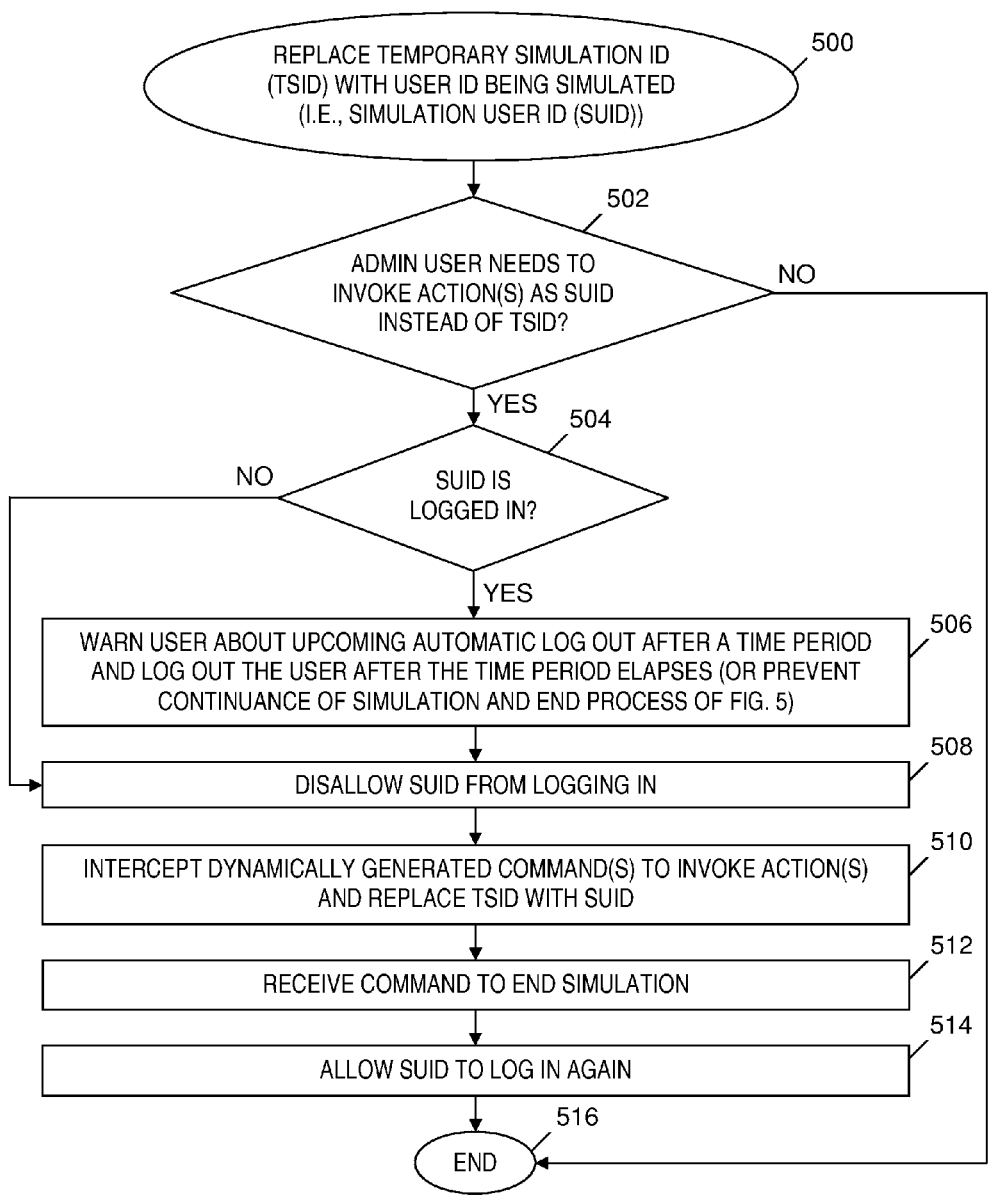
FIG. 5 is a flowchart of a process of replacing a temporary simulation ID with a simulation user ID, in accordance with embodiments of the present invention.

FIG. 5 is a flowchart of a process of replacing a temporary simulation ID with a simulation user ID, in accordance with embodiments of the present invention. The process of replacing a TSID with a SUID starts at step 500. In one embodiment, the steps in the process of FIG. 5 replace step 222 in FIG. 2B. Hereinafter, in the discussion of FIG. 5, the TSID refers to the TSID generated in step 210 (see FIG. 2A) and the SUID refers to the SUID being simulated in the process of FIGS. 2A-2B.

In step 502, if configuration change testing tool 104 (see FIG. 1) determines that the admin user needs to invoke actions in application 106 (see FIG. 1) as the SUID rather than the TSID, then the Yes branch of step 502 is taken and step 504 is performed. Prior to performing step 502 and taking the Yes branch of step 502, configuration change testing tool 104 (see FIG. 1) receives a selection of an option to invoke all actions in application 106 (see FIG. 1) as the SUID during a simulation rather than as the TSID, even though the TSID is logged into application 106 (see FIG. 1). Alternately, configuration change testing tool 104 (see FIG. 1) may retrieve a configuration from a property file that indicates that all actions in application 106 (see FIG. 1) are to be executed as the SUID rather than as the TSID.

Again, invoking actions as the SUID rather than as the TSID may be advantageous in debugging an issue in application 106 (see FIG. 1) in cases in which an element or characteristic of the SUID itself causes the issue, and the element of characteristic may not be immediately apparent (e.g., issues caused by the length of the SUID, a special character in the SUID, or records associated with the SUID).

In step 504, if configuration change testing tool 104 (see FIG. 1) determines that the SUID is logged in by the user who is identified by the SUID, then the Yes branch of step 504 is taken and step 506 is performed.

In step 506, configuration change testing tool 104 (see FIG. 1) presents a warning to the user identified by the SUID about an upcoming automatic log out after a specified time period that is configurable. For example, the warning may state "Please save your work within the next X minutes, as your user ID will be logged out for troubleshooting purposes." The warned user may use the specified time period to save any updates or perform other actions before the automatic log out. Following the presentation of the warning, configuration change testing tool 104 (see FIG. 1) automatically logs out the user after the specified time period elapses.

In an alternate embodiment, in step 506, configuration change testing tool 104 (see FIG. 1) prevents the continuance of the simulation and subsequently ends the process of FIG. 5.

Step 508 follows step 506 and also follows a determination by the configuration change testing tool 104 (see FIG. 1) in step 504 that the SUID is not logged into application 106 (see FIG. 1). In step 508, configuration change testing tool 104 (see FIG. 1) disallows the SUID from logging into (or logging back into) application 106 (see FIG. 1) for the duration of the simulation.

In step 510, configuration change testing tool 104 (see FIG. 1) (1) intercepts dynamically generated command(s) that would have invoked action(s) in application 106 (see FIG. 1) for the TSID in step 222 (see FIG. 2B); (2) replaces the TSID with the SUID, and (3) invokes the action(s) in application 106 (see FIG. 1) for the SUID instead of the TSID.

In step 512, configuration change testing tool 104 (see FIG. 1) receives a command from the SAID to end the simulation. In step 514, configuration change testing tool 104 (see FIG. 1) allows the SUID to log into application 106 (see FIG. 1) again. Following step 514, the process of FIG. 5 ends at step 516.

Returning to step 502, if configuration change testing tool 104 (see FIG. 1) determines that the admin user does not need to invoke action(s) as the SUID instead of the TSID, then the No branch of step 502 is taken, and the process of FIG. 5 ends at step 516.

Figure 6:
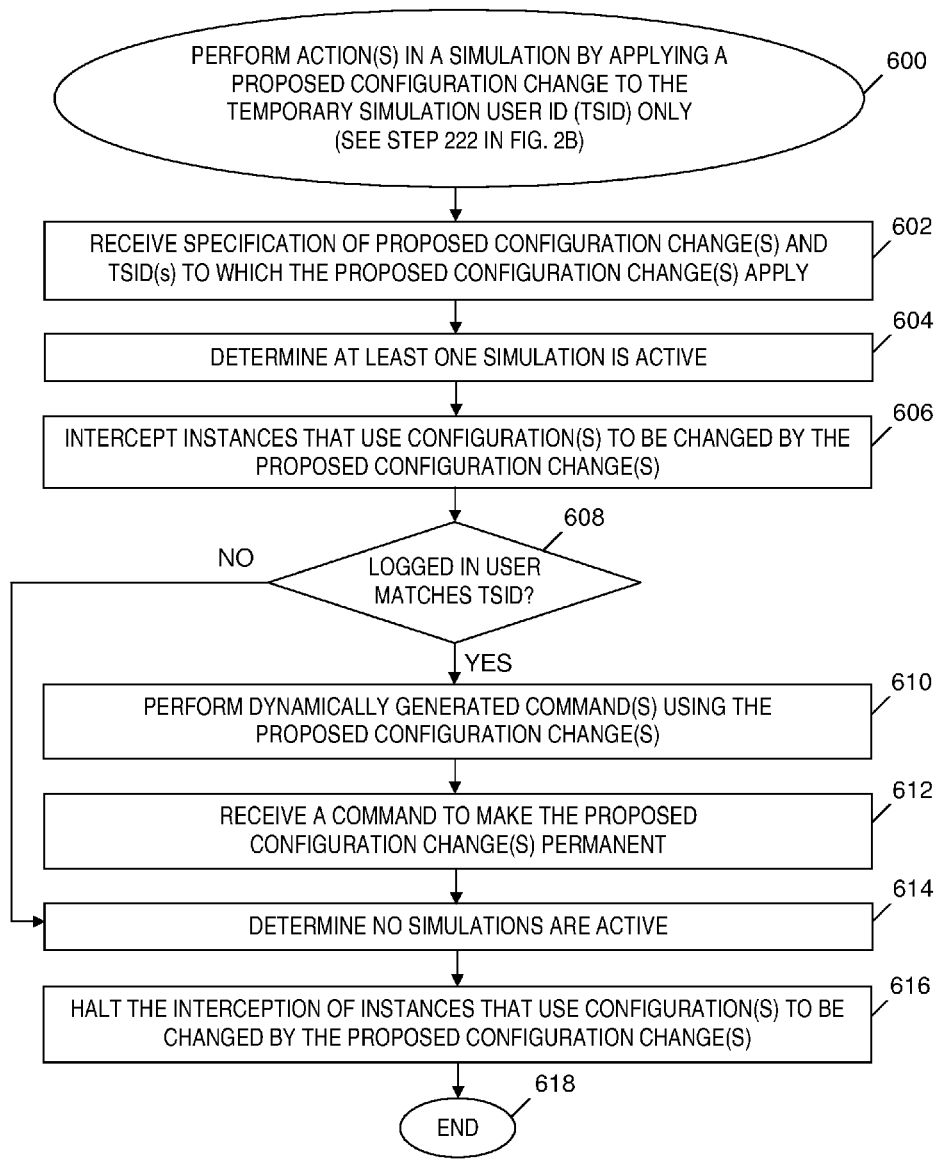
FIG. 6 is a flowchart of a process of performing action(s) in a simulation by applying a proposed configuration change to a temporary simulation ID, in accordance with embodiments of the present invention.

FIG. 6 is a flowchart of a process of performing action(s) in a simulation by applying a proposed configuration change to a temporary simulation ID, in accordance with embodiments of the present invention. The process of performing action(s) in a simulation by applying the proposed configuration change 116 (see FIG. 1) to a TSID only begins at step 600. In one embodiment, the process of FIG. 6 is included in step 222 (see FIG. 2B). Hereinafter, in the discussion of FIG. 6, the TSID refers to the TSID generated in step 210 (see FIG. 2A) and the SUID refers to the SUID being simulated in the process of FIGS. 2A-2B.

In step 602, configuration change testing tool 104 (see FIG. 1) receives a specification of proposed configuration change(s) including proposed configuration change 116 (see FIG. 1). Also in step 602, configuration change testing tool 104 (see FIG. 1) receives TSID(s) to which the received proposed configuration change(s) apply.

In step 604, configuration change testing tool 104 (see FIG. 1) determines that at least one simulation of a SUID is active.

In step 606, configuration change testing tool 104 (see FIG. 1) intercepts instances of application 106 (see FIG. 1) that use configuration(s) to be changed by the proposed configuration change(s) received in step 602.

If configuration change testing tool 104 (see FIG. 1) determines in step 608 that the user logged into application 106 (see FIG. 1) matches the TSID (i.e., the logged in user is identified by a user ID that matches the TSID in terms of values of configurable attributes), then the Yes branch of step 608 is taken and step 610 is performed.

In step 610, configuration change testing tool 104 (see FIG. 1) performs dynamically generated command(s) using the proposed configuration change(s) received in step 602.

In step 612, configuration change testing tool 104 (see FIG. 1) receives a command to make the proposed configuration change(s) permanent.

In step 614, configuration change testing tool 104 (see FIG. 1) determines that no simulation of a SUID is active.

In step 616, configuration change testing tool 104 (see FIG. 1) halts the interception of instances of application 106 (see FIG. 1) that use configuration(s) to be changed by the proposed configuration change(s). The process of FIG. 6 ends at step 618.

Returning to step 608, if configuration change testing tool 104 (see FIG. 1) determines that the user logged into application 106 (see FIG. 1) does not match the TSID, then the No branch of step 608 is taken, and the process of FIG. 6 continues with step 614, as described above.

Computer System

Figure 7:
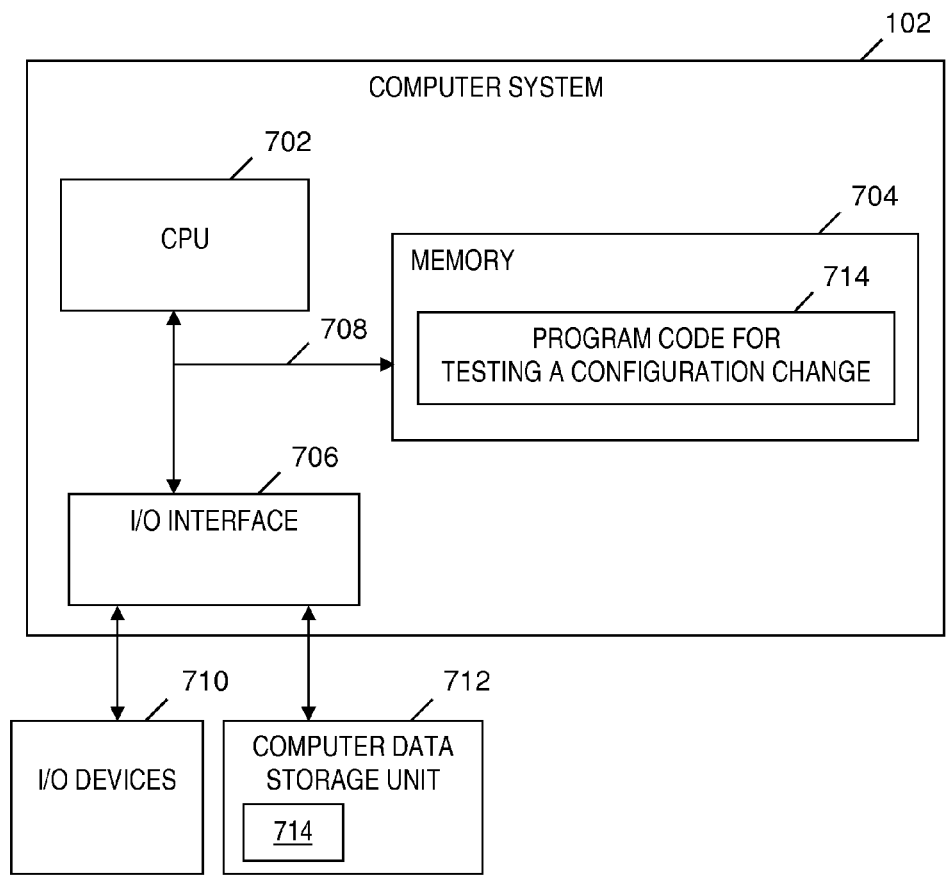
FIG. 7 is a block diagram of a computer system that is included in the system of FIG. 1 and that implements the processes of FIGS. 2A-2B, FIG. 3, FIGS. 4A-4B, FIG. 5 and FIG. 6, in accordance with embodiments of the present invention.

FIG. 7 is a block diagram of a computer system that is included in the system of FIG. 1 and that implements the processes of FIGS. 2A-2B, FIG. 3, FIGS. 4A-4B, FIG. 5 and FIG. 6, in accordance with embodiments of the present invention. Computer system 102 generally comprises a central processing unit (CPU) 702, a memory 704, an input/output (I/O) interface 706, and a bus 708. Further, computer system 102 is coupled to I/O devices 710 and a computer data storage unit 712. CPU 702 performs computation and control functions of computer system 102, including carrying out instructions included in program code 714 to perform a method of testing a configuration change by simulating a user, where the instructions are carried out by CPU 702 via memory 704. CPU 702 may comprise a single processing unit, or be distributed across one or more processing units in one or more locations (e.g., on a client and server). In one embodiment, program code 714 includes code for the configuration change testing tool 104 (see FIG. 1) for testing a configuration change.

Memory 704 may comprise any known computer-readable storage medium, which is described below. In one embodiment, cache memory elements of memory 704 provide temporary storage of at least some program code (e.g., program code 714) in order to reduce the number of times code must be retrieved from bulk storage while instructions of the program code are carried out. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computer system 102, and may comprise any type of transmission link, including electrical, optical, wireless, etc.

I/O interface 706 also allows computer system 102 to store information (e.g., data or program instructions such as program code 714) on and retrieve the information from computer data storage unit 712 or another computer data storage unit (not shown). Computer data storage unit 712 may comprise any known computer-readable storage medium, which is described below. For example, computer data storage unit 712 may be a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are carried out by CPU 702 via memory 704 to test a configuration change. Although FIG. 7 depicts memory 704 as including program code 714, the present invention contemplates embodiments in which memory 704 does not include all of code 714 simultaneously, but instead at one time includes only a portion of code 714.

Further, memory 704 may include other systems not shown in FIG. 7, such as an operating system (e.g., Linux®) that runs on CPU 702 and provides control of various components within and/or connected to computer system 102. Linux is a registered trademark of Linus Torvalds in the United States, other countries, or both.

Storage unit 712 and/or one or more other computer data storage units (not shown) that are coupled to computer system 102 may store modified data records repository 118 (see FIG. 1), configurable attributes data repository 112 (see FIG. 1) and/or TSIDS 114-1 . . . 114-N (see FIG. 1) generated using the process of FIGS. 2A-2B.

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 704 and/or computer data storage unit 712) having computer-readable program code (e.g., program code 714) embodied or stored thereon.

Any combination of one or more computer-readable mediums (e.g., memory 704 and computer data storage unit 712) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 714) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 714) embodied on a computer-readable medium may be transmitted using any appropriate medium, including but not limited to wireless, wireline, optical fiber cable, RF, etc., or any suitable combination of the foregoing.

Computer program code (e.g., program code 714) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks and logos are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 7. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B, FIG. 3, FIGS. 4A-4B, FIG. 5 and FIG. 6) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 714). These computer program instructions may be provided to one or more hardware processors (e.g., CPU 702) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowcharts and/or block diagram block or blocks.

These computer program instructions may also be stored in a computer-readable medium (e.g., memory 704 or computer data storage unit 712) that can direct a computer (e.g., computer system 102), other programmable data processing apparatus, or other devices to function in a particular manner, such that the instructions (e.g., program 714) stored in the computer-readable medium produce an article of manufacture including instructions which implement the function/act specified in the flowcharts and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 714) which are carried out on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to testing a configuration change. Thus, an embodiment of the present invention discloses a process for supporting computer infrastructure, wherein the process comprises a first computer system providing at least one support service for at least one of integrating, hosting, maintaining and deploying computer-readable code (e.g., program code 714) in a second computer system (e.g., computer system 102) comprising one or more processors (e.g., CPU 702), wherein the processor(s) carry out instructions contained in the code causing the second computer system to test a configuration change.

In another embodiment, the invention provides a method that performs the process steps of the invention on a subscription, advertising and/or fee basis. That is, a service provider, such as a Solution Integrator, can offer to create, maintain, support, etc. a process of testing a configuration change. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2A-2B, FIG. 3, FIGS. 4A-4B, FIG. 5 and FIG. 6 and the block diagrams in FIG. 1 and FIG. 7 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 714), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of testing a change in a configuration of a computing environment, the method comprising the steps of:
   a computer receiving a first user identifier (ID) of a first user in the computing environment, the first user ID received from a second user logged into the computing environment using a second user ID specifying the second user as having an authority of an administrator in the computing environment;
   the computer determining a first set of one or more configurable attributes of the first user ID;
   the computer generating a temporary user ID having a second set of one or more configurable attributes so that values of respective configurable attributes in the first and second sets of configurable attributes are identical;
   the computer receiving the change in the configuration of the computing environment;
   the computer associating the change in the configuration with the temporary user ID and with no other user ID;
   based on the change in the configuration being associated with the temporary user ID and with no other user ID, the computer performing a simulation by tracking modifications to data records made by the temporary user ID and based on the change in the configuration, the change in the configuration not affecting the first and second user IDs; and
   after a completion of the simulation, the computer undoing the modifications to the data records.

2. The method of claim 1, wherein the step of tracking modifications to data records made by the temporary user ID and based on the change in the configuration includes the steps of:
   the computer determining the temporary user ID initiates an update of a data record included in the data records;
   in response to the step of determining the temporary user ID initiates the update, the computer exporting the data record into a temporary file; and
   the computer updating the data record.

3. The method of claim 1, wherein the step of tracking modifications to data records made by the temporary user ID and based on the change in the configuration includes the steps of:
   the computer determining the temporary user ID initiates a deletion of a data record included in the data records;
   in response to the step of determining the temporary user ID initiates the deletion, the computer exporting the data record into a temporary file; and
   the computer deleting the data record.

4. The method of claim 1, wherein the step of tracking modifications to data records made by the temporary user ID and based on the change in the configuration includes the steps of:
   the computer determining the temporary user ID initiates an insertion of a data record into a database;
   in response to the step of determining the temporary user ID initiates the insertion, the computer performing the insertion of the data record into the database; and
   the computer storing a primary key and database table of the inserted data record in a temporary file.

5. The method of claim 1, wherein the step of undoing the modifications to the data records includes the steps of:
   the computer determining whether each modification to the data records applies to transactional data;
   if a modification of a data record included in the modifications to the data records applies to transactional data, the computer setting the status of the data record to canceled;

if the modification of the data record included in the modifications to the data records does not apply to transactional data, the computer determining whether the modification was an update or a deletion of the data record that was exported into a temporary file, or whether the modification was an insertion of the data record into a database;

if the modification was the update or the deletion, the computer importing the exported data record from the temporary file; and if the modification was the insertion, the computer deleting the inserted data record based on a primary key and database table of the inserted data record.

6. The method of claim 1, further comprising the steps of:

the computer determining the second user requires an invocation of an action in the simulation as the first user ID rather than as the temporary user ID;

the computer determining that the first user is logged in with the first user ID;

the computer presenting a warning to the first user about an automatic log out of the first user ID after a time period elapses;

after the time period elapses, the computer automatically logging out the first user ID;

the computer disallowing the first user ID from logging in during the simulation;

the computer intercepting a dynamically generated command to invoke the action during the simulation;

the computer replacing the temporary user ID with the first user ID in the dynamically generated command;

the computer receiving another command to end the simulation; and subsequent to the step of receiving the other command to end the simulation, the computer allowing the first user ID to log in.

7. The method of claim 1, wherein the step of the computer associating the change in the configuration with the temporary user ID and with no other user ID includes:

the computer receiving the change in the configuration and the temporary user ID to which the change in the configuration applies;

the computer determining the simulation is active;

the computer intercepting an instance of an application that uses the configuration being changed by the change in the configuration;

the computer determining a user logged into the application matches the temporary user ID;

the computer performing a dynamically generated command using the change in the configuration;

the computer receiving a command to make the change in the configuration permanent;

the computer making the change in the configuration permanent;

subsequent to the step of making the change in the configuration permanent, the computer determining no simulation of a user ID is active; and the computer halting interception of any instance of the application that uses the configuration.

8. The method of claim 1, wherein the steps of receiving the first user ID, determining the first set of one or more configurable attributes of the first user ID, generating the temporary user ID, receiving the change in the configuration, associating the change in the configuration with the temporary user ID and with no other user ID, performing the simulation by tracking modifications to data records made by the temporary user ID, and undoing the modifications to the data records are performed in a production environment.

9. A computer system comprising:

a central processing unit (CPU);

a memory coupled to the CPU;

a computer-readable, tangible storage device coupled to the CPU, the storage device containing instructions that, when carried out by the CPU via the memory, implement a method of testing a change in a configuration of a computing environment, the method comprising the steps of:

the computer system receiving a first user identifier (ID) of a first user in the computing environment, the first user ID received from a second user logged into the computing environment using a second user ID specifying the second user as having an authority of an administrator in the computing environment;

the computer system determining a first set of one or more configurable attributes of the first user ID;

the computer system generating a temporary user ID having a second set of one or more configurable attributes so that values of respective configurable attributes in the first and second sets of configurable attributes are identical;

the computer system receiving the change in the configuration of the computing environment;

the computer system associating the change in the configuration with the temporary user ID and with no other user ID;

based on the change in the configuration being associated with the temporary user ID and with no other user ID, the computer system performing a simulation by tracking modifications to data records made by the temporary user ID and based on the change in the configuration, the change in the configuration not affecting the first and second user IDs; and after a completion of the simulation, the computer system undoing the modifications to the data records.

10. The computer system of claim 9, wherein the step of tracking modifications to data records made by the temporary user ID and based on the change in the configuration includes the steps of:

the computer system determining the temporary user ID initiates an update of a data record included in the data records;

in response to the step of determining the temporary user ID initiates the update, the computer system exporting the data record into a temporary file; and the computer system updating the data record.

11. The computer system of claim 9, wherein the step of tracking modifications to data records made by the temporary user ID and based on the change in the configuration includes the steps of:

the computer system determining the temporary user ID initiates a deletion of a data record included in the data records;

in response to the step of determining the temporary user ID initiates the deletion, the computer system exporting the data record into a temporary file; and the computer system deleting the data record.

12. The computer system of claim 9, wherein the step of tracking modifications to data records made by the temporary user ID and based on the change in the configuration includes the steps of:

the computer system determining the temporary user ID initiates an insertion of a data record into a database;

in response to the step of determining the temporary user ID initiates the insertion, the computer system performing the insertion of the data record into the database; and the computer system storing a primary key and database table of the inserted data record in a temporary file.

13. The computer system of claim 9, wherein the step of undoing the modifications to the data records includes the steps of:
   the computer system determining whether each modification to the data records applies to transactional data;
   if a modification of a data record included in the modifications to the data records applies to transactional data, the computer system setting the status of the data record to canceled;
   if the modification of the data record included in the modifications to the data records does not apply to transactional data, the computer system determining whether the modification was an update or a deletion of the data record that was exported into a temporary file, or whether the modification was an insertion of the data record into a database;
   if the modification was the update or the deletion, the computer system importing the exported data record from the temporary file; and
   if the modification was the insertion, the computer system deleting the inserted data record based on a primary key and database table of the inserted data record.

14. The computer system of claim 9, wherein the method further comprises the steps of:
   the computer system determining the second user requires an invocation of an action in the simulation as the first user ID rather than as the temporary user ID;
   the computer system determining that the first user is logged in with the first user ID;
   the computer system presenting a warning to the first user about an automatic log out of the first user ID after a time period elapses;
   after the time period elapses, the computer system automatically logging out the first user ID;
   the computer system disallowing the first user ID from logging in during the simulation;
   the computer system intercepting a dynamically generated command to invoke the action during the simulation;
   the computer system replacing the temporary user ID with the first user ID in the dynamically generated command;
   the computer system receiving another command to end the simulation; and
   subsequent to the step of receiving the other command to end the simulation, the computer system allowing the first user ID to log in.

15. A computer program product comprising:
   a computer-readable, tangible storage device; and
   computer-readable program instructions stored in the computer-readable, tangible storage device, the computer-readable program instructions, when carried out by a central processing unit (CPU) of a computer system, implement a method of testing a change in a configuration of a computing environment, the method comprising the steps of:
      the computer system receiving a first user identifier (ID) of a first user in the computing environment, the first user ID received from a second user logged into the computing environment using a second user ID specifying the second user as having an authority of an administrator in the computing environment;
      the computer system determining a first set of one or more configurable attributes of the first user ID;
      the computer system generating a temporary user ID having a second set of one or more configurable attributes so that values of respective configurable attributes in the first and second sets of configurable attributes are identical;
      the computer system receiving the change in the configuration of the computing environment;
      the computer system associating the change in the configuration with the temporary user ID and with no other user ID;
      based on the change in the configuration being associated with the temporary user ID and with no other user ID, the computer system performing a simulation by tracking modifications to data records made by the temporary user ID and based on the change in the configuration, the change in the configuration not affecting the first and second user IDs; and
      after a completion of the simulation, the computer system undoing the modifications to the data records.

16. The program product of claim 15, wherein the step of tracking modifications to data records made by the temporary user ID and based on the change in the configuration includes the steps of:
   the computer system determining the temporary user ID initiates an update of a data record included in the data records;
   in response to the step of determining the temporary user ID initiates the update, the computer system exporting the data record into a temporary file; and
   the computer system updating the data record.

17. The program product of claim 15, wherein the step of tracking modifications to data records made by the temporary user ID and based on the change in the configuration includes the steps of:
   the computer system determining the temporary user ID initiates a deletion of a data record included in the data records;
   in response to the step of determining the temporary user ID initiates the deletion, the computer system exporting the data record into a temporary file; and
   the computer system deleting the data record.

18. The program product of claim 15, wherein the step of tracking modifications to data records made by the temporary user ID and based on the change in the configuration includes the steps of:
   the computer system determining the temporary user ID initiates an insertion of a data record into a database;
   in response to the step of determining the temporary user ID initiates the insertion, the computer system performing the insertion of the data record into the database; and
   the computer system storing a primary key and database table of the inserted data record in a temporary file.

19. The program product of claim 15, wherein the step of undoing the modifications to the data records includes the steps of:
   the computer system determining whether each modification to the data records applies to transactional data;
   if a modification of a data record included in the modifications to the data records applies to transactional data, the computer system setting the status of the data record to canceled;
   if the modification of the data record included in the modifications to the data records does not apply to transactional data, the computer system determining whether the modification was an update or a deletion of the data record that was exported into a temporary file, or whether the modification was an insertion of the data record into a database;

if the modification was the update or the deletion, the computer system importing the exported data record from the temporary file; and if the modification was the insertion, the computer system deleting the inserted data record based on a primary key and database table of the inserted data record.

20. The program product of claim 15, wherein the method further comprises the steps of:

the computer system determining the second user requires an invocation of an action in the simulation as the first user ID rather than as the temporary user ID;

the computer system determining that the first user is logged in with the first user ID;

the computer system presenting a warning to the first user about an automatic log out of the first user ID after a time period elapses;

after the time period elapses, the computer system automatically logging out the first user ID;

the computer system disallowing the first user ID from logging in during the simulation;

the computer system intercepting a dynamically generated command to invoke the action during the simulation;

the computer system replacing the temporary user ID with the first user ID in the dynamically generated command;

the computer system receiving another command to end the simulation; and subsequent to the step of receiving the other command to end the simulation, the computer system allowing the first user ID to log in.

\* \* \* \* \*